United States Patent [19]

Simmons

[11] 3,860,475

[45] Jan. 14, 1975

[54] METHOD FOR BONDING ORIENTED POLYESTER FILMS

[75] Inventor: Walter J. Simmons, Martinsburg, W. Va.

[73] Assignee: E. I. du Pont de Nemours and Company, Wilmington, Del.

[22] Filed: Aug. 16, 1972

[21] Appl. No.: 281,165

[52] U.S. Cl.................. 156/285, 156/308, 156/497, 156/499
[51] Int. Cl. .......................... C09j 5/02, B23b 31/00
[58] Field of Search...... 53/373, 375; 156/285, 307, 156/308, 497, 499

[56] References Cited
UNITED STATES PATENTS

| | | | |
|---|---|---|---|
| 2,820,735 | 1/1958 | Amborski | 161/231 X |
| 2,849,359 | 8/1958 | Smith | 156/308 |
| 3,488,244 | 1/1970 | Lepisto | 156/359 |

*Primary Examiner*—Charles E. Van Horn
*Assistant Examiner*—Robert A. Dawson

[57] ABSTRACT

A method is provided for bonding biaxially oriented films of polymeric linear terephthalate esters by applying to at least one of the surfaces to be bonded an agent having at least an incipient solvent action on the film at elevated temperature, bringing the surfaces together and thereafter impinging on the area of juncture a gas stream delivered at a linear velocity of at least 100 feet per second, the gas being maintained at a temperature of at least 290°C.

6 Claims, No Drawings

METHOD FOR BONDING ORIENTED POLYESTER FILMS

BACKGROUND OF THE INVENTION

1. Field of Invention

This invention is directed to the bonding of biaxially oriented films of polymeric linear terephthalate esters.

2. Description of the Prior Art

It has long been known to heat seal or bond polymeric films which are thermoplastic or which bear a thermoplastic coating by heating the surfaces to be bonded and pressing them together with a heated bar, or rod or other mechanical device to insure intimate contact. Sealing with an open flame or with a heated air stream has also been employed for bonding such thermoplastic films as the polyolefin films.

The methods described above have been inadequate for bonding highly oriented films such as those of polyalkylene terephthalates wherein bonds or welds substantially as strong as the film are desired. The use of a sealable coating on such films gives a seal or bond only as strong as the coating. In order to heat seal noncoated oriented films excessively high temperatures are required and seals so obtained are in general unsatisfactory because of shrinking, puckering as well as weakening of film areas adjacent to the seals.

To overcome such difficulties as described above, methods have been developed for bonding polyester films through the use of solvents. In U.S. Pat. No. 2,820,735 there is described a process for bonding polymeric linear terephthalate ester structures by applying benzyl alcohol to the surfaces to be bonded, bringing the surfaces together and thereafter applying pressure and heat over the area of juncture. In U.S. Pat. No. 2,849,359 there is described a process of applying an incipient plasticizer to the surfaces of a polymeric terephthalate ester film to be joined, pressing the surfaces together and heating them to a temperature of 250°–280°F. A relatively large number of incipient plasticizing agents are described. While these methods represent an improvement over the art existing at that time, there are some shortcomings associated with their use. As described in trade literature, *Modern Packaging*, April 1956, page 89 and August 1956, page 177, for acceptable performance these methods require critical control of sealing temperature and amount of agent applied to the film surfaces before bonding. Acceptable sealing performance is described at sealing temperatures around 350°F. Use of higher sealing temperature, which would be required for attaining acceptable seals at high production rates, tends to distort and weaken the film. Where excess agent has been applied to the film the subsequent sealing operation tends to entrap the agent in the sealed area thereby reducing the overall strength of the seal.

Accordingly, an improved method of sealing polymeric terephthalate ester films especially adaptable for high-speed packaging operations has been sought.

SUMMARY OF THE INVENTION

It has now been found that biaxially oriented films of linear polymeric terephthalate esters can be bonded with a high strength seal at a high production rate. The method comprises applying to the surface or surfaces to be joined an agent which has at least an incipient solvent action on the film at elevated temperature, bringing the surfaces together and effecting the sealing of the surfaces by impinging a gas stream over the area of juncture.

The suitability of agents for application to the oriented polyester film can be determined by applying a thin layer of the agent on a strip of the film, placing another strip of film thereon and sealing the two in a conventional type bar heat sealer. A pressure of 20 pounds per square inch, dwell time of two seconds and a temperature in the range of about 160°–180°C. gives satisfactory results. An agent is considered to have at least an incipient solvent action on the film if the sealed strips show a peel seal strength of at least 1000 grams for a 1½-inch wide seal area. Agents which satisfy this requirement include benzyl alcohol, aniline, ethylene bromohydrin, ethylene chlorohydrin, furfuryl alcohol, glycerol dichlorohydrin, glycerol trichlorohydrin, pyridine, benzaldehyde, furfural, salicylaldehyde, ortho-, meta and paracresols, hydroquinone (10% solution in ethanol), phenol (20% in chloroform), resorcinol (10% solution in ethanol) dioxane, orthonitroanisole, sulfolane, morpholine, dimethylsulfoxide, nitrobenzene and tetrachloroethane.

As to amounts of the agent to be applied, a sufficient quantity should be applied to provide at least a continuous layer on the surface to be sealed. A particular advantage of the present method is that the two surfaces to be united are urged into intimate contact solely by the force of the gas stream. Any excess of the agent applied to the surface is permitted to escape from the sealed area, thus insuring the formation of a strong seal.

The sealing agent can normally be applied by means of a felt wick. However, other methods such as roll applicators or a doctor knife can also be employed. The width of the application can vary depending on the width of the seal desired. In the case of benzyl alcohol, excellent seals are obtained with alcohol feeds as high as 0.9 ml/min. and as low as 0.1 ml/min. at a film speed of 60 feet per minute.

Polymeric linear terephthalate ester films that can be treated by the method of this invention are those prepared by reacting normal or branched chain glycols containing from 2–10 carbon atoms with terephthalic acid or with terephthalic acid and from 0–20% by weight of a second acid such as isophthalic acid, dibenzoic acid, hexahydroterephthalic acid, adipic acid, sebacic acid, or azelaic acid. A mixture of glycols can also be used in the synthesis of the polyester. Particular glycols which can be used are ethylene glycol, trimethylene glycol, tetramethylene glycol, pentamethylene glycol, 1,2-dihydroxypropane, 1,3-dihydroxybutane, octamethylene glycol and decamethylene glycol. Films other than highly oriented polyester film such as nylon, vinyl and cast polyester films can also be bonded by this method.

In general, the gas stream used to impinge on the area to be sealed will be hot air. However, nitrogen or carbon dioxide or other noninflammable gas can also be used. The gas stream is delivered at a linear velocity of at least 100 feet per second, the main criterion being that the force of the hot gas stream on the area of juncture must be sufficient to produce effective bonding of the surfaces. Preferably the hot gas stream is delivered at a linear velocity in the range of 100 to 500 feet per second.

The temperature of the gas impinging on the area of juncture should be at least about 290°C. in order to effect bonding of the film at a minimum sealing speed of 10 feet per minute. The upper temperature limit will depend mainly on the particular sealing speed to be employed. Hot gas temperatures that are too high at a given speed will cause burn-through of the film. A gas stream supplied at a temperature in the range of about 290°C. to about 700°C. is preferred for the bonding of biaxially oriented polyethylene terephthalate films at sealing speeds ranging from 10 feet per minute to 100 feet per minute.

The gap between the tip of the gas delivery tube and the surface to be sealed may be varied depending on the width of seal desired. For most purposes a preferred gap is in the range of one thirty-second to one-half inch. For instance, hot air delivered through a one-eighth inch gap at a linear velocity of 300 feet per second from a one-eighth inch diameter heater tip produces a seal one-fourth inch wide. A variety of air jet configurations can be used; a round tip provides a most uniform seal and can be easily varied to increase or decrease seal width as desired. With this method of sealing, the sealing temperature is not especially critical. For instance, at a sealing speed of 70 feet per minute with a gas stream delivered at a linear velocity of 300 feet per second through a one-eighth inch air gap seals as strong as the film are obtained at temperatures ranging from about 400°C. to 700°C. As indicated, the precise conditions used will depend on the width of seal desired, film speed as well as strength of seal desired.

Various types of heating means can be employed for supplying the hot gas stream. The Sylvania Serpentine Heater designed and engineered to heat a flowing gas stream under accurately controlled conditions and a hot air heater obtained from Kartridge Pak Company are particularly well suited for this purpose.

This method of sealing can be incorporated in various types of packaging machines for the packaging of various products. A particularly useful arrangement involves the use of this method of sealing on a so-called "chub" or "form and fill" packaging machine similar to that described in U.S. Pat. No. 2,831,302 wherein a package is made by forming a flat film into a side seam sealed tube over a suitable forming mandrel and when filled with the product is thereafter closed by suitable means such as metal clips. Typical chub products include sausage, cheese, ice cream, blasting gelatin as well as packages of various adhesive systems held in separated compartments prior to use to prevent premature reaction of the respective ingredients.

DESCRIPTION OF THE PREFERRED EMBODIMENTS

The preferred film for treatment in accordance with the method of this invention is a biaxially oriented heat-set polyethylene terephthalate film. The preferred solvent is benzyl alcohol and it is preferred to use hot air as the gas stream.

To illustrate the sealing method 1.5 ml. biaxially oriented, heat-set polyethylene terephthalate films were formed into tubes and sealed on a Kartridge Pak Co. chub machine, benzyl alcohol being applied at about 0.3 ml/min. to the surfaces to be joined in a side seam prior to feeding the folded tube through the hot air sealing section. Hot air was delivered through a one-eighth inch gap at a linear velocity of 300 feet per second. In one set of experiments a sealing speed of 40 feet per minute and hot air temperature of approximately 425°C. was employed. In a second set of experiments of sealing speed of 100 feet per minute and hot air temperature of 705°C. was used. The tubes produced in this way (3–4 feet long sections) were then tested for bursting strength. Typical results are shown below.

| I.D. of Tube | Burst Pressure | Stress on Film |
|---|---|---|
| 1" | 51 psi | 19,000 psi |
| 1½" | 37 | 19,500 |
| 2" | 27 | 19,000 |

In most of the tests the tube ruptured in an area other than the seal area, indicating that a seal substantially as strong as the film was obtained. In all cases a smooth seal was obtained, with no indication of wrinkling or puckering in or near the sealed area.

I claim:

1. In a process for bonding biaxially oriented films of linear polymeric terephthalate esters by applying over the area of juncture of at least one of the film surfaces to be united an agent having at least an incipient solvent action on the film at elevated temperature, bringing the surfaces together and thereafter applying pressure and heat at an elevated temperature to bond the films,
   the improvement which comprises continuously bonding the films at a sealing speed of at least ten feet per minute while impinging over the area of juncture a gas stream delivered from a jet positioned from one thirty-second to one-half inch from the surface of the juncture at a linear velocity of at least 100 feet per second, the gas stream being maintained at a temperature of about 290°C to about 700°C., the film surfaces in the area of juncture being held in intimate contact for bonding solely by the force of the gas stream.

2. The method of claim 1 wherein the gas stream is delivered at a linear velocity in the range of 100 to 500 feet per second.

3. The method of claim 2 wherein the agent applied to the surface of the group consisting of benzyl alcohol, aniline, ethylene bromohydrin, ethylene chlorohydrin, furfuryl alcohol, glycerol, dichlorohydrin, glycerol trichlorohydrin, pyridine, benzaldehyde, furfural, salicylaldehyde, ortho-, meta- and paracresols, hydroquinone, phenol, resorcinol, dioxane, orthonitroanisole, sulfolane, morpholine, dimethylsulfoxide, nitrobenzene and tetrachloroethane.

4. The method of claim 3 wherein the agent is benzyl alcohol.

5. The method of claim 4 wherein the film to be bonded is a biaxially oriented heat-set film of polyethylene terephthalate.

6. The method of claim 5 wherein the gas stream is hot air.

* * * * *